(12) United States Patent
Mueller et al.

(10) Patent No.: US 10,542,546 B2
(45) Date of Patent: Jan. 21, 2020

(54) COMMUNICATIONS SYSTEM WITH CONTROL OF ACCESS TO A SHARED COMMUNICATIONS MEDIUM

(71) Applicant: Robert Bosch GmbH, Stuttgart (DE)

(72) Inventors: Andreas Mueller, Waiblingen (DE); Anton Pfefferseder, Sauerlach (DE); Tobias Gruber, Munich (DE); Florian Klingler, Munich (DE); Daniel Barisic, Haar (DE); Timo Lothspeich, Gerlingen (DE); Christoph Burger-Scheidlin, Munich (DE); Volker Blaschke, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 98 days.

(21) Appl. No.: 14/369,740

(22) PCT Filed: Oct. 29, 2012

(86) PCT No.: PCT/EP2012/071402
§ 371 (c)(1),
(2) Date: Jun. 30, 2014

(87) PCT Pub. No.: WO2013/097962
PCT Pub. Date: Jul. 4, 2013

(65) Prior Publication Data
US 2014/0362800 A1    Dec. 11, 2014

(30) Foreign Application Priority Data

Dec. 29, 2011  (DE) .................. 10 2011 090 110

(51) Int. Cl.
*H04W 72/04* (2009.01)
*H04W 52/02* (2009.01)
(Continued)

(52) U.S. Cl.
CPC ..... *H04W 72/048* (2013.01); *H04W 52/0219* (2013.01); *H04W 72/1215* (2013.01); *H04W 76/20* (2018.02); *Y02D 70/00* (2018.01)

(58) Field of Classification Search
None
See application file for complete search history.

(56) References Cited

U.S. PATENT DOCUMENTS

| 6,542,736 B1 * | 4/2003 | Parkvall | H04W 28/20 |
| | | | 370/465 |
| 7,263,089 B1 * | 8/2007 | Hans | H04L 1/007 |
| | | | 370/328 |

(Continued)

FOREIGN PATENT DOCUMENTS

EP    1357704    10/2003

OTHER PUBLICATIONS

International Search Report for Application No. PCT/EP2012/071402 dated Feb. 26, 2013 (English Translation, 2 pages).

*Primary Examiner* — Jeffrey M Rutkowski
*Assistant Examiner* — David M Oveissi
(74) *Attorney, Agent, or Firm* — Michael Best & Friedrich LLP

(57) ABSTRACT

The present invention relates to a communications system (1) with at least one node (101, 102, 110), a control instance (10) and a shared communications medium (11). The at least one node is designed to receive messages that are or were transmitted in a first transmission mode. This first transmission mode has a lower data transmission rate and/or transmission complexity than a second transmission mode. The control instance (10) determines a first of the nodes in order to transmit data thereto in the second transmission mode or in order to release the shared communications medium (11) for the first node to transmit data in the second transmission mode. The control instance communicates this to the first (Continued)

node by means of a message (501, 502, 503, 504). This message is transmitted in the first transmission mode.

14 Claims, 3 Drawing Sheets

(51) Int. Cl.
*H04W 72/12* (2009.01)
*H04W 76/20* (2018.01)

(56) References Cited

U.S. PATENT DOCUMENTS

| | | | | |
|---|---|---|---|---|
| 7,962,131 | B2* | 6/2011 | Lee | H04W 72/0406 370/338 |
| 8,411,612 | B2* | 4/2013 | Lee | H04W 72/1257 370/315 |
| 8,811,142 | B2* | 8/2014 | Wang | H04W 72/04 370/204 |
| 8,811,359 | B2* | 8/2014 | Wang | H04W 72/0493 370/338 |
| 8,831,668 | B2* | 9/2014 | Vermani | H04W 52/08 455/522 |
| 8,897,168 | B2* | 11/2014 | Dwivedi | H04W 76/023 370/252 |
| 8,954,076 | B2* | 2/2015 | Lim | H04W 72/0406 370/252 |
| 9,026,589 | B1* | 5/2015 | Desai | G06F 17/30023 709/204 |
| 9,107,221 | B2* | 8/2015 | Cordeiro | H04W 74/0816 |
| 9,288,837 | B2* | 3/2016 | Yanagihara | H04W 84/20 |
| 9,572,193 | B2* | 2/2017 | Horneman | H04W 76/14 |
| 2002/0172162 | A1* | 11/2002 | Goodings | H04B 1/715 370/280 |
| 2003/0091004 | A1* | 5/2003 | Tang | H04L 1/0003 370/252 |
| 2003/0203740 | A1* | 10/2003 | Bahl | H04W 52/46 455/516 |
| 2003/0225549 | A1* | 12/2003 | Shay | H04L 41/5009 702/182 |
| 2005/0010763 | A1* | 1/2005 | Matsui | H04L 63/0464 713/165 |
| 2005/0031059 | A1* | 2/2005 | Moore | G01S 13/878 375/346 |
| 2006/0034223 | A1* | 2/2006 | Kim | H04W 52/146 370/331 |
| 2006/0159050 | A1* | 7/2006 | Kim | H04W 36/02 370/331 |
| 2006/0203841 | A1* | 9/2006 | Fischer | H04W 16/14 370/461 |
| 2006/0205443 | A1* | 9/2006 | Simoens | H04L 1/0003 455/574 |
| 2006/0239293 | A1* | 10/2006 | Vasil'evich | H04L 1/0002 370/445 |
| 2006/0285515 | A1* | 12/2006 | Julian | H04W 72/12 370/328 |
| 2007/0010237 | A1* | 1/2007 | Jones | H04W 88/10 455/422.1 |
| 2007/0195689 | A1* | 8/2007 | Dapper | G06F 17/14 370/204 |
| 2007/0206695 | A1* | 9/2007 | Ye | H04L 1/0003 375/267 |
| 2008/0101598 | A1* | 5/2008 | Dillaway | H04L 63/20 380/44 |
| 2008/0112499 | A1* | 5/2008 | Bennett | H04B 7/00 375/267 |
| 2008/0159362 | A1* | 7/2008 | Gelbman | H04W 52/262 375/219 |
| 2008/0205648 | A1* | 8/2008 | Hanov | H04L 5/1453 380/270 |
| 2008/0233922 | A1* | 9/2008 | Lesrel | G08C 17/02 455/412.1 |
| 2008/0253351 | A1* | 10/2008 | Pernu | H04W 88/06 370/345 |
| 2008/0259826 | A1* | 10/2008 | Struhsaker | H04W 84/14 370/280 |
| 2008/0316952 | A1* | 12/2008 | Gruber | H04W 72/005 370/312 |
| 2009/0168919 | A1* | 7/2009 | Sato | H03C 1/36 375/295 |
| 2009/0196258 | A1* | 8/2009 | Escobar Sanz | H04W 36/0066 370/332 |
| 2010/0014500 | A1* | 1/2010 | Lee, II | H04L 1/0017 370/342 |
| 2010/0118887 | A1* | 5/2010 | Matsumoto | H04L 12/403 370/465 |
| 2010/0125764 | A1* | 5/2010 | Kose | H03M 13/1171 714/704 |
| 2010/0208654 | A1* | 8/2010 | Sampath | H04L 47/10 370/328 |
| 2010/0279672 | A1* | 11/2010 | Koskela | H04W 36/30 455/418 |
| 2011/0080868 | A1* | 4/2011 | Krishnaswamy | H04W 48/18 370/328 |
| 2011/0103269 | A1* | 5/2011 | Zheng | H04B 7/15557 370/279 |
| 2011/0137614 | A1* | 6/2011 | Wheeler | H04L 67/12 702/188 |
| 2011/0149836 | A1* | 6/2011 | Hong | H04B 7/18543 370/316 |
| 2011/0176415 | A1* | 7/2011 | Settembre | H04L 1/0003 370/230 |
| 2011/0194419 | A1* | 8/2011 | Lee | H04H 20/423 370/242 |
| 2011/0216696 | A1* | 9/2011 | Lippolis | H04W 40/00 370/328 |
| 2012/0106517 | A1* | 5/2012 | Charbit | H04W 72/04 370/336 |
| 2012/0115536 | A1* | 5/2012 | Vermani | H04W 52/08 455/522 |
| 2012/0207100 | A1* | 8/2012 | Hakola | H04W 76/023 370/329 |
| 2013/0039324 | A1* | 2/2013 | Kwon | H04W 76/023 370/329 |
| 2013/0100822 | A1* | 4/2013 | Caillerie | H04B 7/04 370/241 |
| 2013/0137477 | A1* | 5/2013 | Ozaki | H04W 52/367 455/522 |
| 2013/0155966 | A1* | 6/2013 | Bekiares | H04W 28/16 370/329 |
| 2013/0194995 | A1* | 8/2013 | Reinhardt | H04W 52/0219 370/311 |
| 2013/0265975 | A1* | 10/2013 | Shirani-Mehr | H04B 15/00 370/329 |
| 2013/0272280 | A1* | 10/2013 | Kinnunen | H04L 5/001 370/336 |
| 2014/0064203 | A1* | 3/2014 | Seo | H04W 28/06 370/329 |
| 2014/0226639 | A1* | 8/2014 | Yi | H04W 74/04 370/336 |
| 2014/0254429 | A1* | 9/2014 | Wang | H04L 5/0037 370/254 |
| 2014/0286293 | A1* | 9/2014 | Jang | H04L 5/0044 370/329 |
| 2014/0321313 | A1* | 10/2014 | Seo | H04J 11/00 370/252 |
| 2014/0349659 | A1* | 11/2014 | Ishii | H04W 8/082 455/444 |
| 2015/0071189 | A1* | 3/2015 | Park | H04W 76/023 370/329 |

\* cited by examiner

COMMUNICATIONS SYSTEM WITH CONTROL OF ACCESS TO A SHARED COMMUNICATIONS MEDIUM

BACKGROUND OF THE INVENTION

The present invention relates to a communications system in which access to a communications medium used by a plurality of nodes in a shared fashion is suitably controlled. The invention additionally relates to methods of controlling access to a communications medium.

In many communications systems a plurality of nodes can communicate with one another via a shared communications medium. In this case, it must be ensured that different users can be separated. If a plurality of users transmit data simultaneously in an uncontrolled manner, meaningful detection of individual users may not be possible. Therefore, control of access to the shared medium is an important element in communications technology.

In so-called "competing methods" the various nodes of the system are in competition for access to the shared communications medium. Examples of such methods include carrier sense multiple access (CSMA), ALOHA and Slotted ALOHA.

With the use of this method, collisions can occur, however, in the event of different subscribers attempting access simultaneously. Particularly in systems having a multiplicity of subscribers and/or a high level of traffic, this can result in a lower (accumulated) data throughput. Moreover, hard real-time requirements can be guaranteed only with great difficulty or cannot be guaranteed at all. If the subscribers are supplied with energy via the shared communications medium itself, simultaneous attempts at access by different subscribers can furthermore be problematic from this standpoint as well. This can be the case particularly if the maximum power consumption is restricted, for example for safety reasons, since the power consumption in the sending mode is usually higher than that in the receiving mode.

By contrast, collisions can be avoided with use of so-called "coordinated methods" in the error-free case. This involves carrying out a defined, exclusive allocation of different resources to different subscribers. These can be time slots, frequency ranges, codes in a code division multiplex method, or the like. The coordination is usually effected here either by a central entity (as in the case of traditional polling or scheduling methods), with the aid of a distributed approach (as is the case for example for "token ring" or "token bus") or by means of a static configuration (as in the case of static time division multiplex methods, for example).

One typical example of a coordinated media access method is a traditional polling approach, in which a central entity as coordinator cyclically interrogates the different subscribers of the system as to whether they have data to transmit. If appropriate, the central entity then temporarily grants access to the shared communications medium.

When a spectrally efficient method is used, which generally has a relatively high complexity (for example with regard to the coding or modulation methods used), a comparatively high energy feed is normally necessary. This is the case particularly at the receiving end, where said method also has the greatest effect because, in general, the number of receiving subscribers or subscribers ready to receive is very much greater than the number of sending subscribers.

Such a high energy feed is often undesirable, however. It can typically be avoided, however, only by the use of a relatively simple, but in return inefficient transmission method. Particularly in the case of embedded communications systems and sensor networks in which only very limited resources are available, endeavors are made to lower energy costs and to increase the maximum possible operating period of battery-operated devices.

Minimizing the energy requirement is additionally of importance if the various nodes are supplied with energy via the shared communications medium itself. A lower energy requirement of an individual node then allows correspondingly more nodes to be connectable to the system, which ultimately in general again leads to lower overall costs.

In accordance with known communications systems, therefore, it is necessary to make a compromise between accumulated power consumption and achievable performance. If a complex, sophisticated transmission method is used, it may be possible to obtain high data rates and low latencies, but in return the overall power consumption is relatively high because all the subscribers must always attempt to detect corresponding signals.

SUMMARY OF THE INVENTION

It is an object of the present invention to provide a communications system which controls access to a communications medium by means of a coordinate media access method and in this case realizes a relatively high data rate in conjunction with low energy consumption by the various nodes and by the system overall.

A communications system and two methods comprising the features of the invention are proposed according to the invention.

The communications system according to the invention comprises one, two or more nodes, a control entity and a shared communications medium. In this case, each node of the communications system can communicate with the control entity and/or with another node via the communications medium. The communications medium can be, for example, a linear bus or a wireless transmission channel. Preferably, all the nodes can use the same resources for a data transmission, that is to say e.g. the same frequencies on an electrical line or the same wavelengths in an optical waveguide.

In one embodiment, the control entity itself can, if appropriate, simultaneously also assume the role of a node and/or serve for example as a gateway to another system.

The nodes are designed to receive messages which are or were sent in a first transmission mode via the communications medium. The nodes are thus in a first reception mode, i.e. the mode which supports the reception of data in the first transmission mode. Advantageously, the nodes can additionally also send messages in the first transmission mode via the communications medium.

According to the invention, furthermore the control entity is designed to determine or select a first of the nodes in order to send data to said first node in a second transmission mode or in order to release for said first node the shared communications medium for sending data in a second transmission mode. In both cases, the control entity notifies the node of the corresponding determination or selection in a message. This message is sent in the first transmission mode.

The determination or selection can be effected for example cyclically in a pass through all or some of the nodes (for example those nodes which obtain their energy via the shared communications medium) or on the basis of the respective requirement. The individual nodes can also be assigned a rank order which is taken into account in the determination. In this regard, nodes having a higher ranking can be determined more frequently than nodes of lower rank, or the requirement of nodes having a higher ranking can preferentially lead to a determination.

The control entity can also be designed to select the first or second transmission mode dynamically, for example depending on the size or length of a corresponding message, on real-time requirements, or the like.

Analogously, the node determined can be designed to select one of the two transmission modes dynamically depending on e.g. one or more of the stated parameters of size/length of the message or real-time requirements for sending a message.

In this case, the two transmission modes are each defined for example by the respective coding or modulation method(s) and/or the data transmission rate. According to the invention, the second transmission mode allows a higher data transmission rate and/or transmission complexity than the first transmission mode.

Transmission rate and transmission complexity can be independent of one another or at least have mutually independent aspects or parameters. The complexity of a transmission method and the data transmission rate achievable therewith frequently correlate, however, such that a second transmission mode which allows a higher transmission complexity than a first transmission mode automatically also has a higher data transmission rate than the first transmission mode. Conversely, however, the required power consumption for the detection and processing of a signal sent in the first transmission mode can be lower than the required power consumption for the detection and processing of a signal sent in the second transmission mode.

By way of example, uncoded binary frequency shift keying (FSK) is suitable for a method in accordance with the first transmission mode. It can be received and detected with a comparatively low energy requirement. By way of example, a coded orthogonal frequency division multiplex (OFDM) method, if appropriate combined with adaptive bit loading, is suitable for a method in accordance with the second transmission mode. Particularly messages of higher protocol layers can be sent by the node or by the control entity in the second transmission mode.

By means of the release of the shared communications medium to the first node, the control entity therefore controls the access by the node(s) to the communications medium with the aid of which the first node can communicate with the control entity as central entity and, if appropriate, a plurality of nodes can communicate with one another.

As in the case of a traditional polling method, the control entity in this case can grant exclusive access to the shared communications medium. In contrast to traditional polling methods, in this case two different transmission methods are used, however, namely firstly a method which can be used with a relatively low complexity both at the transmitting end and at the receiving end, and secondly a method which is associated with a higher signal processing complexity and consequently a higher energy consumption primarily at the receiving end.

The approach which is realized by the communications system according to the invention has various advantages:

In this regard, the system has a comparatively low (accumulated) overall energy consumption because each of said nodes as standard initially expects only a transmission in the first transmission mode. Said nodes make use of the more complex second transmission mode, which is therefore associated with a higher energy requirement, in particularly only if it is actually necessary. Energy can thus be saved particularly at the receiving end. Further nodes which are in the second reception mode as standard and can additionally be contained in the communications system are described further below.

Furthermore, as a result of the option of being able to change the transmission mode dynamically, a high data rate can be realized despite the relatively low overall energy consumption. This is the case, inter alia, if data of higher protocol layers are intended to be transmitted, which usually make up a large portion of the volume of data to be transmitted.

Finally, a deterministic behavior, i.e. behavior that is foreseeable at least within certain limits, is made available because the media access is generally controlled by the control entity as central entity and it can be ensured that a maximum of one node or a maximally desired number of nodes sends in the second transmission mode and/or is in the second reception mode, i.e. can receive messages sent in the second transmission mode. It is thus possible to design an energy supply of the system via the control entity for this case and thus to support significantly more nodes than would be the case with a non-deterministic or competing media access method (such as e.g. carrier sense multiple access, CSMA).

Advantageously, the first node in the first reception mode cannot receive messages which were sent in accordance with the second transmission mode, but is designed to change to a second reception mode in response to a corresponding notification. In said second reception mode, the first node can then receive data or messages which were sent in the second transmission mode.

Preferably, the message with which the control entity notifies the first node that it has determined said first node comprises an indication of whether the control entity will send data to the node or whether it is releasing to said node the communications medium for sending data in the second transmission mode. This message is sent in the first transmission mode, such that the first node can receive it in the first reception mode. In response to the message, the first node can change to the second reception mode in order to receive data which were sent in the second transmission mode.

After receiving the data, the first node preferably changes to the first reception mode again. In this regard, a low energy consumption of the first node can be re-established and the energy consumption overall can be optimized.

Preferably, the first node is designed to react according to its requirement to the message that the communications medium has been or is being released for said first node for sending and/or receiving data in the second transmission mode:

By way of example, in the case where the first node has no data to send, the first node can indicate this to the control entity in a notification. This notification can be sent in the first or in the second transmission mode; a transmission in that transmission mode which ensures a faster transmission is advantageously provided. In this case, the first node can be designed to select the transmission mode.

Preferably, the first node is designed to send said notification within a predefined time period or at a predefined time after reception of the message about the release. Advantageously, the release of the communications medium for the first node ends with the reception of said notification by the control entity. The latter then has the option, if appropriate, of for example itself sending data or correspondingly releasing the communications medium for another node or for another action of the same node.

If the first node has data to send in the second transmission mode to the control entity, said first node can send said data directly to the control entity using the second transmission mode. By means of an identifier in the header of this data transmission, the latter can be distinguished from the above-described notification about the fact that the first node has no sending requirement. For the purposes of control efficiency it is advantageous in this case, too, if the first node is designed to send the data transmission within a predefined time period or at a predefined time after reception of the message about the release.

In the case where the first node has data to send in the second transmission mode to another node in the communications system, said first node can react to the message about the release by correspondingly informing the other node. This is preferably effected in the form of an announcement message which the first node sends to the other node in the first transmission mode and which announces a subsequent data transmission in the second transmission mode to the other node. The other node can then change over to a reception mode which allows reception of data which were or are sent in the second transmission mode.

In one preferred embodiment, the first node is designed to send the data in the second transmission mode within a predetermined time period or at a predetermined point in time after the announcement message has been sent. Alternatively or additionally, in the announcement message the first node can indicate when the data transmission will take place.

Both versions afford the advantage that the other node can foresee the point in time at which the data transmission will arrive. The other node can thus optimize its changeover of reception mode and thus its energy consumption more precisely from a temporal standpoint. Furthermore, in accordance with this embodiment the control entity can foresee when the data transmission will have taken place.

In one advantageous embodiment, the release of the communications medium for the first node is for a limited period of time.

Advantageously, in this case the release of the communications medium to the first node ends if data sent by the first node in the second transmission mode have been completely transmitted. In this case, the control entity can detect the end of this transmission in various ways, in principle. Firstly, with the aid of so-called "carrier sensing" in a manner similar to that in the case of CSMA, the control entity can permanently monitor when the communications medium is no longer occupied. Secondly, however, the control entity could also monitor and evaluate the announcement message and/or the actual transmission of data effected in the second transmission mode and ascertain the end of the transmission of data on the basis of time indications possibly contained therein. Alternatively or additionally, the control entity can be designed to determine the length and thus the transmission duration or the end of the transmission of a message from the type thereof or the number of bits to be transmitted, if said type or said number is available to the control entity, for example was notified by the sending node or was stipulated by the control entity itself upon the release of the communications medium.

Alternatively, the release of the communications medium to the first node can end after a specific time duration has elapsed since reception of the message about the release. This affords the advantage that the communications system is not blocked in the case of a transmission error and/or processing error. The time duration can be predefined or the first node can be notified thereof in the message about the release.

Finally, the release can end if the control entity gives the first node a corresponding message, for example after some other node, higher in a predefined rank order, has registered a requirement for the communications medium.

In another embodiment of the invention, the release ends only if the first node explicitly gives access to the communications medium back to the control entity again, for example by setting a corresponding flag or with the aid of a suitable message. For such a message, a transmission in the first or in the second transmission mode can be provided or selected by the first node. In this case, the selection is preferably made such that a reduction in the overall energy requirement is achieved. Furthermore, combinations of these approaches are also conceivable.

In one embodiment of the invention, the first node is designed, after receiving a message about the release, firstly to inform the control entity in a notification if it has data to communicate in the second transmission mode to another node. This notification can be sent in the first or second transmission mode, a selection thereof can be stipulated by the communications system, or the first node can be designed to select the transmission mode itself.

The control entity can be designed, after receiving the notification, to decide whether or not it will accommodate the node's wish, i.e. whether it will release to the node the communications medium for sending the data in the second transmission mode to the other node. The release effected previously is therefore only a conditional release, and the control entity has control over what the communications medium is actually used for by the first node.

The control entity can furthermore be designed, in the case where it does not give consent to the transmission to the other node, either simply to carry out the next planned action or to signal to the first node the rejection of the transmission wish with the aid of a suitable message (which is sent in the first or second transmission mode). By contrast, if the control entity gives consent to the first node's transmission wish, then it could indicate consent with the aid of a further message and thus initiate the direct transmission of data from the first node to the other node. Depending on the embodiment, the further message can be sent to the first node or to the other node or to both nodes.

In one embodiment of the present invention, the communications system comprises one or a plurality of further nodes which is (are) designed to receive as standard messages in the second transmission mode. For sending data in the second transmission mode as well, the shared communications medium can be released as standard for said further node(s).

This embodiment is particularly advantageous if the communications system comprises nodes of a first and of a second type, wherein the nodes of the first type are supplied with energy via the shared communications medium and those of the second type (that is to say the further nodes) obtain their energy in a different way.

In this case, the nodes of the first type should be adjusted to sending and/or receiving data in the second transmission mode, as described above, as far as possible only if they actually have corresponding data to send or receive. Otherwise, the nodes of the first type can be in a quiescent mode with a low energy consumption.

By contrast, an energy saving is of less importance for the nodes of the second type, which do not obtain their energy via the shared communications medium. These nodes can therefore then use the second transmission mode as standard.

During a separate initialization phase, for example, the information about what is the standard reception mode of a node (i.e. to what type the node belongs) can be notified to the control entity or stipulated by the latter. In one embodiment, the communications medium runs through a first initialization phase, in which the nodes are classified into nodes of the first and second types, for which a use of the first and second transmission modes, respectively, is then stipulated as a basic setting. In a later, second initialization phase, the type division of the nodes can then be stipulated anew, i.e. each node can be determined anew as being associated with the first or second type and the transmission mode to be used by the node can be correspondingly stipulated.

The present invention can be used in a multiplicity of wire-based, wireless and optical communications systems comprising a central entity (control entity) and a shared communications system. In particular, use of the invention in building automation or else in mobile applications is advantageous.

In accordance with the embodiments described above, the communications system, the control entity and the node(s) are designed to carry out the actions described. The present invention furthermore relates to the underlying methods comprising the steps respectively carried out by the control entity and/or the node if the communications system is controlled according to the invention.

Further advantages and configurations of the invention are evident from the description and the accompanying drawing.

It goes without saying that the features mentioned above and those yet to be explained below can be used not only in the combination respectively indicated, but also in other combinations or by themselves, without departing from the scope of the present invention.

BRIEF DESCRIPTION OF THE DRAWINGS

The invention is illustrated schematically on the basis of exemplary embodiments in the drawings and is described in detail below with reference to the drawings.

DETAILED DESCRIPTION

Figure 1:
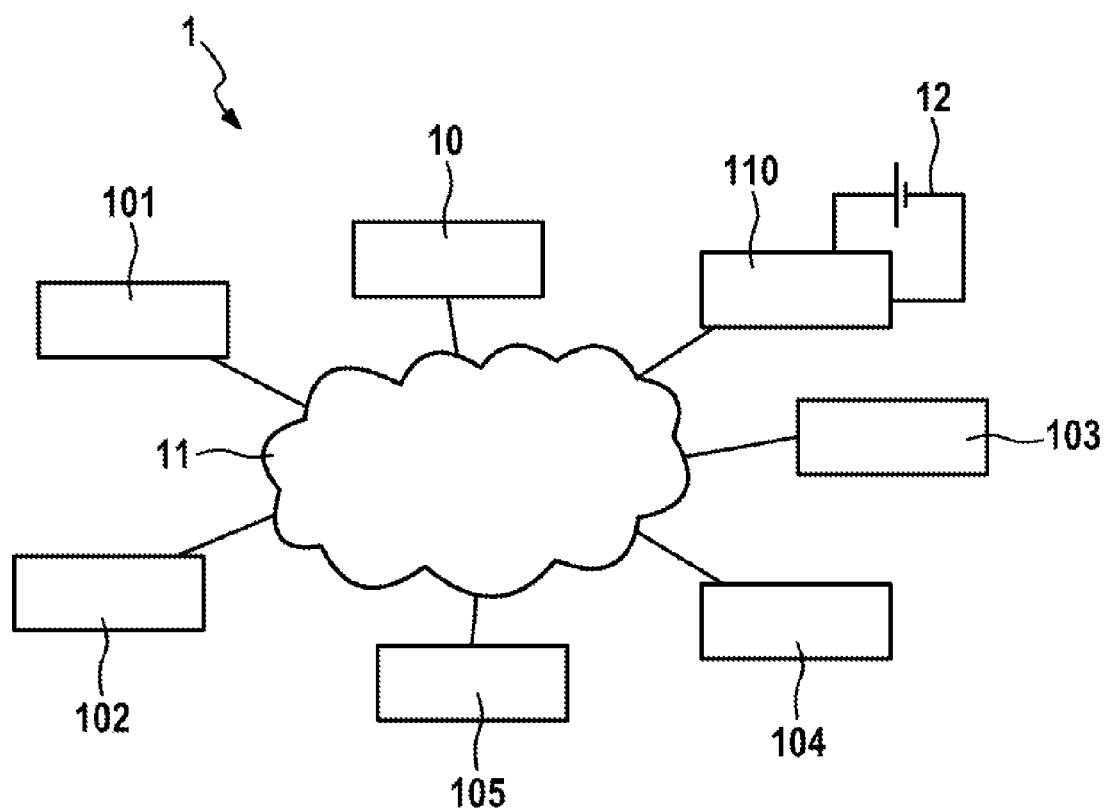
FIG. 1 shows by way of example a communications system in which the present invention can be applied.

The communications system 1 shown in FIG. 1 comprises a control entity 10, a plurality of nodes 101, 102, 103, 104, 110 and a shared communications medium 11, via which the nodes and the control entity can communicate with one another. In this case, the node 110 has a separate energy supply 12, i.e. an energy supply that does not proceed via the shared communications medium.

Figure 2:
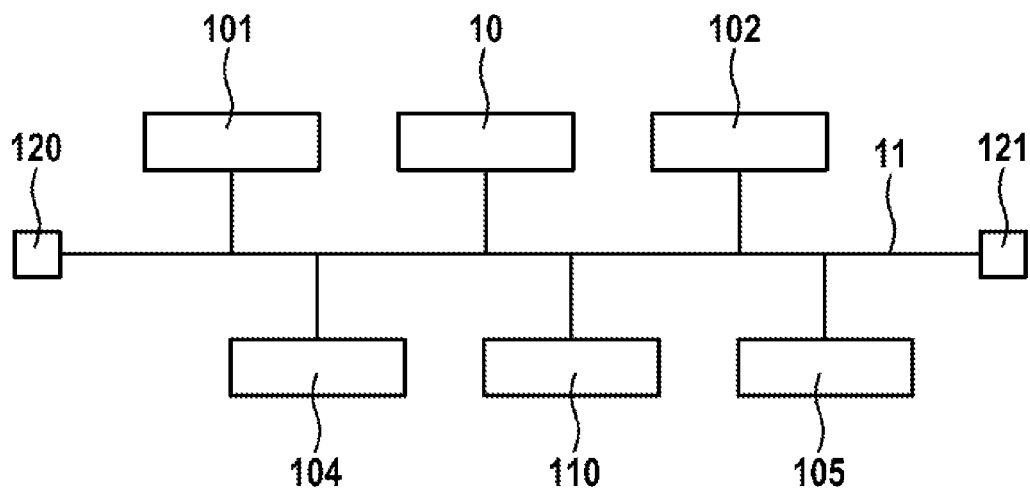
FIG. 2 shows by way of example a typical arrangement of components in a communications system with a linear bus structure.

FIG. 2 illustrates a possible arrangement of the elements in the communications system 1. In this case, the shared communications medium 11 is a linear bus, the ends of which are designated by 120 and 121.

Figure 3:
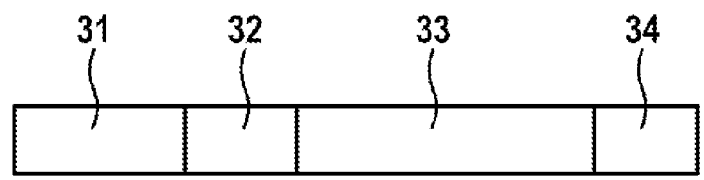
FIG. 3 shows a possible structure of a message in the first transmission mode which can be used in the context of the present invention.

FIG. 3 shows a possible structure for a message which is sent in the first transmission mode. In this case, the message is substantially composed of a preamble 31 for synchronization and, if appropriate, channel estimation, followed by the specification 32 of the message type, the address 33 of the addressed node and, if appropriate, an error detection code (cyclic redundancy check code, CRC) 34. In particular, the order of the fields mentioned could also be a different order than that shown.

Figure 4:
FIG. 4 shows a possible structure of a message in the second transmission mode which can be used in the context of the present invention.

A possible structure for a message which is sent in the second transmission mode is illustrated by way of example in FIG. 4. Here, too, the structure comprises a preamble 41 for synchronization and, if appropriate, channel estimation, followed by a header 42, which can contain, if appropriate, further information about length, content and sender of the message. Furthermore, (if present) the actual payload data 43 and finally once again an error detection code (CRC) 44 are contained. In this case, too, the order illustrated is purely by way of example.

Figure 5:
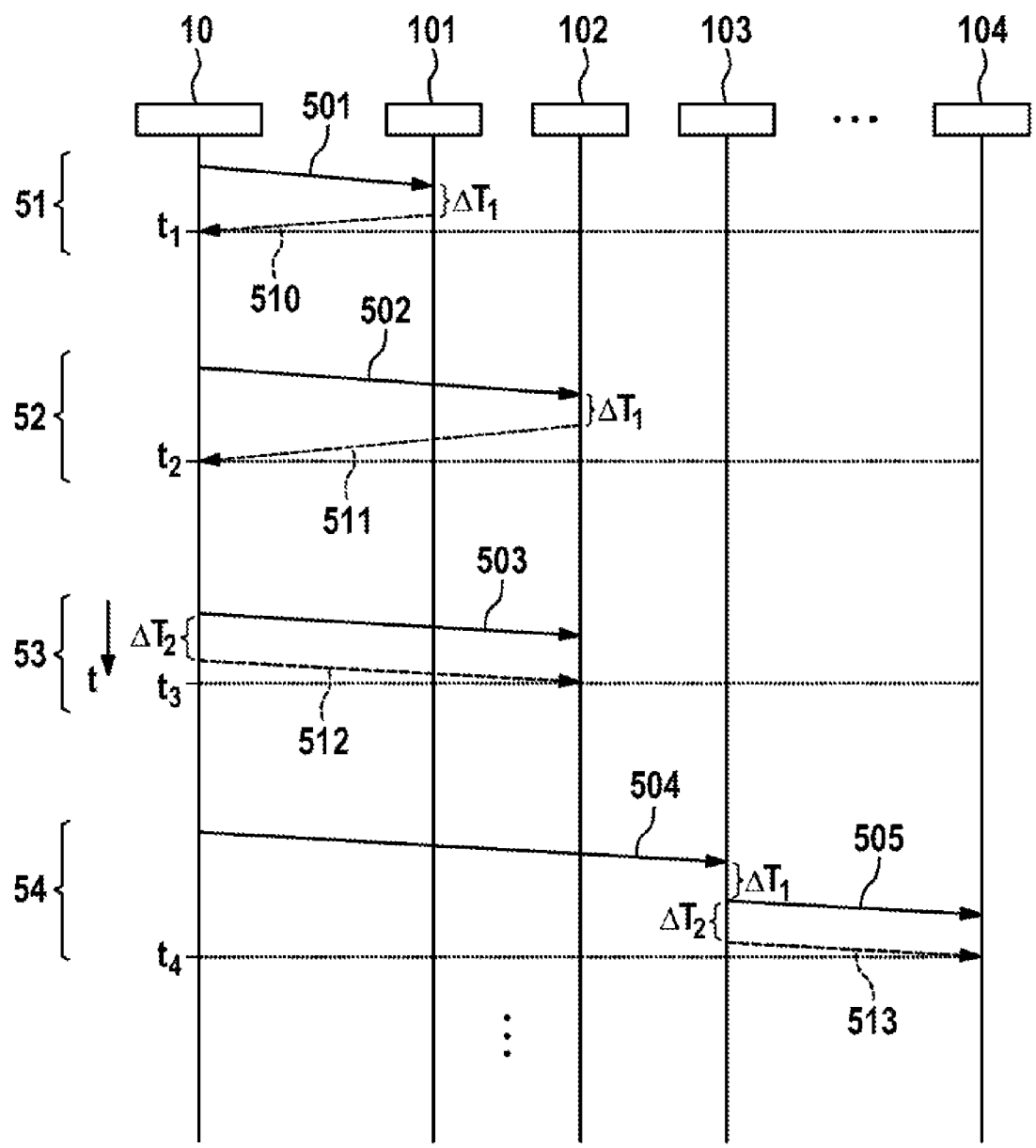
FIG. 5 shows a plurality of sequences with possible message flows which can be used in the context of the present invention.

FIG. 5 illustrates different possible message sequences 51, 52, 53 and 54 which can be exchanged between a control entity and different nodes as the time t elapses. It goes without saying that the protocol sequence illustrated is purely by way of example. In particular, the order of the sequences 51, 52, 53 and 54 can be interchanged as desired, individual sequences thereof can be absent or occur multiply, and the nodes respectively addressed can be the same in a plurality of sequences or further messages (not illustrated) can be sent and received.

The messages 501, 502, 503, 504 and 505 illustrated by solid arrows are sent in each case in the first transmission mode. By contrast, sending in the second transmission mode is indicated by dashed arrows. This concerns the messages 510, 511, 512 and 513.

With the messages 501, 502 and 504, the control entity indicates to the respectively selected and addressed node that the shared communications medium has been or is being released for the node for sending data in the second transmission mode.

The sequence 51 shows the situation that the selected, addressed node 101 has no data to send and indicates this to the control entity by sending a specific message 510 after a predefined time $\Delta T_1$. The message 510 arrives at the control entity at the point in time $t_1$. With said message the node 101 gives control over the shared communications medium back to the control entity again.

The node sends said specific message 510 in the second transmission mode. This is possible because the control entity in this case is implicitly fixed as receiver and therefore need not first be addressed by a preceding transmission in the first mode. As an alternative, however, the message 510 could also be sent in the first transmission mode.

The sequence 52 concerns the situation that the node 102 addressed by the control entity 10 with the message 502 has messages to send in the second transmission mode, to be precise to the control entity. Once again after the predefined time $\Delta T_1$, the node sends the data using the second transmission mode with the message 511 directly to the control entity, where they arrive at the point in time $t_2$.

For distinguishing the message 511 with which a node sends data from messages with which a node indicates that it has no data to send, the message 511 can have a corresponding identifier within its header.

The control entity 10 also has the option of itself transmitting data in the second transmission mode to a node. As is shown in the sequence 53, the control entity initially announces such a transmission of data in a message 503 sent in the first transmission mode. After a predefined time $\Delta T_2$, the control entity then sends the data with the message 512 in the second transmission mode, said message arriving at the point in time $t_3$. In this case, control over the shared communications medium remains with the control entity itself for the entire time.

As described above, a node that has been determined, after access to the shared communications medium has been granted, can if appropriate, however, also transmit data directly to another node within the system. This is illustrated in FIG. 5 with the sequence 54 for the node 103.

The node 103 receives the message 504 about the release of the shared communications medium. After a predefined time $\Delta T_1$ has elapsed, the node 103 announces to the other node 104 the intended transmission of data in a message 505. This message is sent in the first transmission mode. After a predetermined duration $\Delta T_2$, which can be the same as $\Delta T_1$ or a shorter or longer duration, the node 103 sends data in the second transmission mode to the node 104, as is indicated by the message 513 in FIG. 5. In this case, after reception of the message 512, the node 104 has available the time $\Delta T_2$ in order to be adjusted to the reception of data in the second transmission mode. The duration $\Delta T_2$ can be stipulated such that it encompasses a required time expenditure by the other node for the changeover from the first to the second reception mode, corresponds to said expenditure or exceeds it by a predefined buffer time.

After the transmission 513 of data, control over the shared communications medium is transferred automatically to the control entity again at the point in time $t_4$.

The invention claimed is:

1. A communications system (1) comprising at least one node (101, 102, 110), a control entity (10) and a shared communications medium (11),
   wherein the at least one node is designed to receive messages sent in a first transmission mode;
   wherein the control entity (10) is configured to determine a first of the nodes
   in order to send data to said first node in a second transmission mode or in order to release the shared communications medium (11) to the effect that the first node sends data in the second transmission mode,
   and wherein the control entity (10) is furthermore designed to notify the first node by a message (501, 502, 503, 504) that it has determined said first node,
   wherein said message is sent in the first transmission mode; and
   wherein the second transmission mode has a higher data transmission rate and transmission complexity than the first transmission mode;
   wherein the first node
   sends (510) data in the second transmission mode to the control entity (10) when the message includes a first indicator,
   sends an announcement message (505) directly to another node (104) in the communications system in the first transmission mode and subsequently sends (513) data in the second transmission mode to the other node when the message includes a second indicator, and
   receives (512) data sent in the second transmission mode when the message includes a third indicator;
   and
   wherein the announcement message (505) indicates to the other node (104) that the subsequently sent data (513) will be in the second transmission mode.

2. The communications system as claimed in claim 1, wherein the release of the shared communications medium for sending data is temporally limited and ends if the first node has sent data in the second transmission mode and these data were communicated ($t_1$, $t_2$, $t_4$);
   or if a predetermined time ($\Delta T_1$) has elapsed after sending of the message by the control entity or after reception of said message by the first node;
   or if the first node has indicated to the control entity within a predetermined period ($\Delta T_1$) in a notification (510) that there is no requirement or no longer a requirement for the use of the shared communications medium in the second transmission mode;
   or if the control entity gives the node a corresponding message.

3. The communications system as claimed in claim 1, wherein the control entity selects the first node on the basis of a capacity utilization of the shared communications medium and/or on the basis of a requirement indicated by the first node.

4. The communications system as claimed in claim 3, wherein the requirement indicated by the first node is a real-time requirement.

5. The communications system as claimed in claim 3, wherein the requirement indicated by the first node is a size of a message to be sent.

6. The communications system as claimed in claim 1, which comprises at least one second node (110) designed to receive messages which were sent in the second transmission mode,
   wherein the at least one second node has an energy supply (12) which is separate from the shared communications medium.

7. The communications system as claimed in claim 1, wherein the first transmission mode comprises a signal transmission by uncoded binary frequency shift keying;
   and/or wherein the second transmission mode comprises a signal transmission by a coded orthogonal frequency division multiplex method, which signal transmission is combined with an adaptive bit loading.

8. A method of communication in a communications system (1) comprising
   at least two nodes (101, 102, 103),
   a control entity (10) and
   a shared communications medium (11),
   wherein the method comprises the following steps to be carried out by the control entity:
   determining a first node; and
   sending a message (501, 502, 503, 504) in a first transmission mode to the first node, wherein the message contains an indication and
   the control entity will send data in a second transmission mode to the first node when the indication is a first indication; and
   the control entity releases the shared communications medium (11) for the node to send data in the second transmission mode when the indication is a second indication;
   wherein the second transmission mode has a higher data transmission rate and transmission complexity than the first transmission mode; and
   wherein the node (103) is a first node and the communications system (1) comprises a further node (104), and wherein the method furthermore comprises the following steps to be carried out by the first node when the indication is a third indication:

sending a notification (505) in the first transmission mode to the further node, wherein the notification announces a data transmission in the second transmission mode;

and sending data (513) in the second transmission mode directly to the further node.

9. The method as claimed in claim 8, which furthermore comprises one or more of the following steps to be carried out by the first node (101, 102, 103):

sending (510) data in the second transmission mode to the control entity (10);

receiving (512) data which were or are sent by the control entity in the second transmission mode;

sending (510) a second message to the control entity, wherein the second message indicates that the first node has no requirement or no further requirement for the use of the shared communications medium in the second transmission mode.

10. The method as claimed in claim 8, wherein determining the first node is based on a capacity utilization of the shared communications medium and/or on a requirement indicated by the first node, such as real-time requirements, or a size of a message (511, 512, 513) to be sent.

11. The method as claimed in claim 8, which additionally comprises the following step to be carried out by the control entity (10):

stipulating that at least one second node can receive as standard, data which were sent in the second transmission mode.

12. A method of communication in a communications system (1) comprising a node (101, 102, 103), a control entity (10) and a shared communications medium (11), wherein the method comprises the following steps to be carried out by the node (101, 102, 103):

receiving one or a plurality of message(s) (501, 502, 505) from the control entity or another node in the communications system, wherein the one or the plurality of message(s) was/were or is/are sent in a first transmission mode and contains/contain an indication, wherein, based on the indication, the node receives data sent in a second transmission mode;

the shared communications medium (11) is released for the node for sending data in the second transmission mode;

and the node receives data sent in the second transmission mode (512, 513)

the node sends (510, 511, 513) data in the second transmission mode;

wherein the second transmission mode has a higher data transmission rate and transmission complexity than the first transmission mode; and wherein the node (103) is a first node and the communications system (1) comprises a further node (104), and wherein the method furthermore comprises the following steps to be carried out by the first node, based on the indication:

sending a notification (505) in the first transmission mode to the further node, wherein the notification announces a data transmission in the second transmission mode;

and sending data (513) in the second transmission mode directly to the further node.

13. The method as claimed in claim 12, wherein the method additionally comprises the following step to be performed by the further node (104):

changing over from a first reception mode, in which only data sent in the first transmission mode can be received, to a second reception mode, in which data sent in the second transmission mode can be received.

14. A non-transitory computer-readable medium or a plurality of non-transitory computer-readable media, on which instructions are stored which, if they are executed on a computer, carry out the method of claim 9.

* * * * *